United States Patent
Iyengar

(10) Patent No.: US 7,904,686 B2
(45) Date of Patent: Mar. 8, 2011

(54) DATA SECURITY FOR USE WITH A FILE SYSTEM

(75) Inventor: Ranganath G. Iyengar, Kamataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 346 days.

(21) Appl. No.: 12/152,595

(22) Filed: May 13, 2008

(65) Prior Publication Data

US 2009/0327635 A1  Dec. 31, 2009

(30) Foreign Application Priority Data

Jul. 31, 2007  (IN) .......................... 1671/CHE/2007

(51) Int. Cl.
  *G06F 12/00*  (2006.01)
(52) U.S. Cl. ...................................... 711/163

(58) Field of Classification Search .................. None
See application file for complete search history.

(56) References Cited

U.S. PATENT DOCUMENTS

| | | | |
|---|---|---|---|
| 7,024,583 B2 | 4/2006 | Nguyen et al. | |
| 7,430,585 B2* | 9/2008 | Sibert | 709/216 |
| 2003/0120938 A1* | 6/2003 | Mullor | 713/190 |
| 2004/0153718 A1* | 8/2004 | Shen et al. | 714/5 |
| 2006/0080520 A1* | 4/2006 | Dickenson | 711/170 |
| 2007/0250719 A1* | 10/2007 | Lai et al. | 713/190 |
| 2008/0022396 A1* | 1/2008 | Kado | 726/19 |
| 2008/0034264 A1* | 2/2008 | Kaabouch et al. | 714/732 |

* cited by examiner

*Primary Examiner* — Hiep T Nguyen

(57) ABSTRACT

An embodiment of the invention provides an apparatus and method for providing data security for use with a file system. The apparatus and method performs acts including: applying a mapping function to data block numbers that are associated with a file; and obtaining mapped data block numbers after applying the mapping function, wherein the mapped data block numbers are addresses of data of the file in a storage device.

18 Claims, 3 Drawing Sheets

DATA SECURITY FOR USE WITH A FILE SYSTEM

TECHNICAL FIELD

Embodiments of the invention relate generally to data security for use with a file system.

BACKGROUND

A current method of providing security to data (e.g., software or other types of files) that is stored in a storage device (e.g., compact disk) so that unauthorized copying of the data is prevented is to provide encryption for the data. Therefore, access to the data is not permitted unless the user has the proper decryption code for the data. However, encryption-decryption software applications are typically time consuming to use and have often caused confusion for the users.

Online licensing checks are performed for some licensed software files to prevent un-authorized copying of software. However, this approach requires the software developer to embed the licensing code in each software file and requires the purchaser to access a public network (e.g., Internet) for the online licensing check.

Furthermore, even if the data in the storage device is subject to a licensing check, an individual can still reconstruct a file (e.g. software) on a different disk, without the need for proper authorization, by retrieving the data blocks that make up the file (or set of files). For example, on a UNIX file system, an individual can retrieve the data blocks of a file by accessing the index node (inode) of the file and completely bypass the application that is used for accessing the file.

On the other hand, if security is not provided to the stored data, then individuals will be able to make unauthorized copies of software or other files that are stored in storage devices (e.g., CDs).

Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
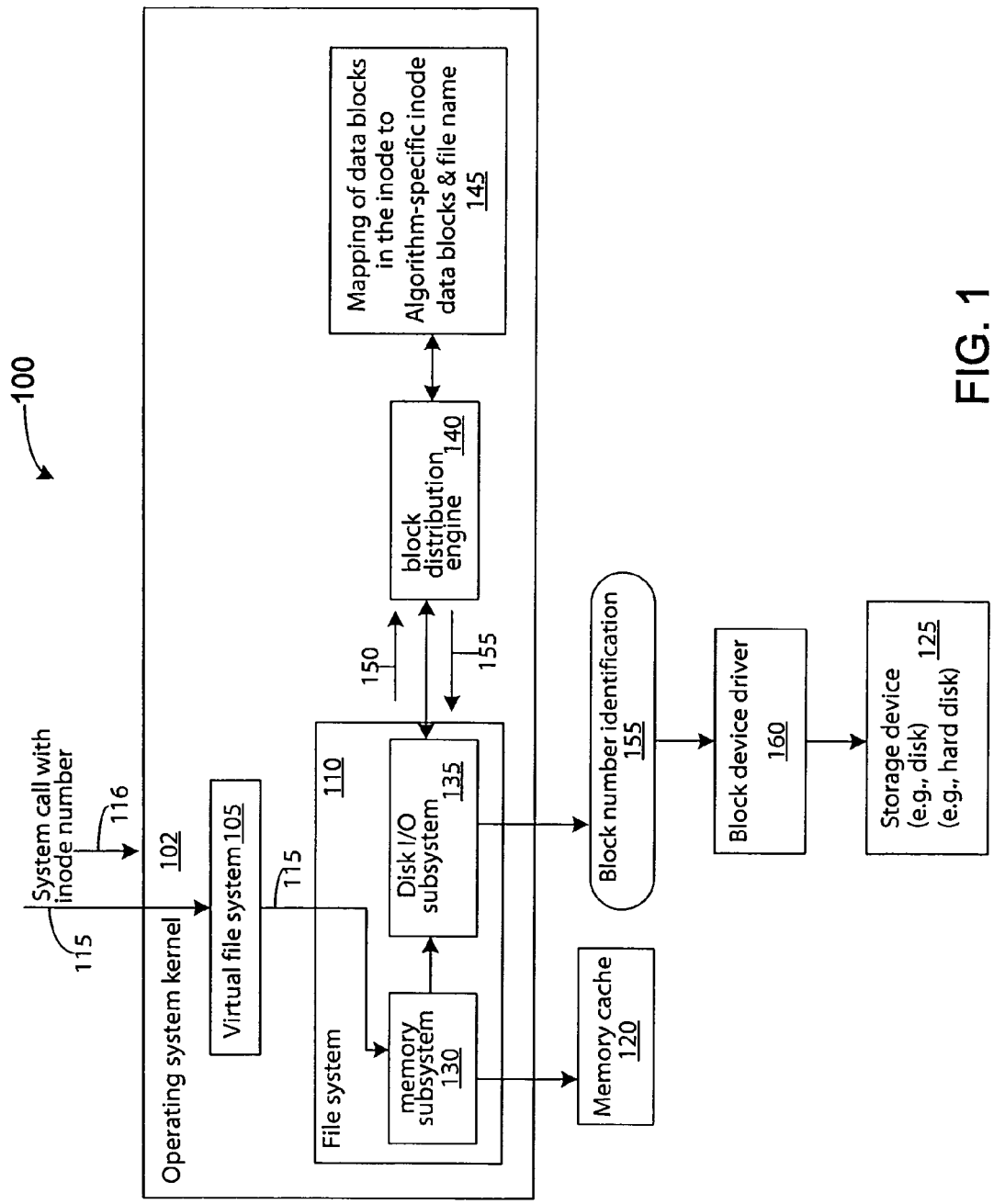
FIG. 1 is a block diagram of an apparatus (system) in accordance with an embodiment of the invention.

FIG. 1 is a block diagram of an apparatus (system) 100 in accordance with an embodiment of the invention. The apparatus 100 can be implemented in, for example, a computer. An operating system kernel 102 includes a virtual file system 105 and a file system 110. It is understood that the operating system 102 includes known modules for performing OS management operations. A virtual file system 105 is typically included in an operating system kernel layer and allows client applications (not shown in FIG. 1) to transparently access the different types of file systems 110 (e.g., Unix file systems, Windows® file systems, MAC® OS file systems) that may be implemented in the kernel 102. However, an embodiment of the invention can also be implemented in a system without the virtual file system 105.

As known to those skilled in the art, an inode (index node) is a data structure that contains information about a file, directory, or other object in a file system. The file can be, for example, a software application, or other types of data such as a WORD® document. The inode data structure is used in, for example, a Unix file system or other types of file systems. The file system 110 will assign a unique inode for each file. Each inode typically contains the following information: the device (e.g., disk) where the inode resides, locking information, mode and type of file, the number of links to the file, the owner's user and group identifiers, the number of bytes in the file, access and modification times of the file, the time the inode itself was last modified, and the addresses of the file's data blocks on the disk.

Assume that the file system 110 has stored a file into a memory such as, for example, a memory cache 120 (e.g., memory in a computer) or a storage device 125 (e.g., CD or hard disk). Since the file system 110 has stored the file, the file system 110 identifies the file by an inode number. The inode number is shown symbolically as arrow 116 in FIG. 1. That inode number, in turn, will index into an inode table that contains the inode for the file. The inode contains the addresses of the file's data blocks on, for example, the storage device (e.g., disk) 125. When a user opens, reads, and/or writes to the file, the system call 115 is processed by the virtual file system 105 and forwarded to the file system 110. The system call 115 also includes the inode number of the file to be opened, read, and/or written.

Typically, the memory subsystem 130 will first check if the data blocks of the file is currently in the memory cache 120. This checking step is an optimization step that increases the speed of opening of, reading of, and/or writing to a file by fetching the data blocks of the files in the memory cache 120, instead of always performing a data block access to the storage device 125. However, an embodiment of the invention may also be implemented in a system that omits the use of a memory subsystem 130 that checks the data blocks in the memory cache 120.

If the data blocks of the file that is identified the inode number (arrow 116) is not in the memory cache 120, then the disk I/O (input/output) subsystem 135 of the file system 110 will handle the system call 115 with the inode number 116. In previous systems, the disk I/O (input/output) subsystem 135 computes the block numbers of the file in order to determine the location in the storage device 125 of the data of the file. Therefore, the block numbers identify the addresses of the file's data blocks on the disk 125.

An embodiment of the invention includes a block distribution engine 140 and mapping 145, in order to perform a block distribution algorithm that provides security to data blocks on a storage device 125. The engine 140 can be programmed by use of standard programming languages (e.g., C, C++, Pascal) and can be programmed by use of standard programming techniques that are known to those skilled in the art. In previous systems, the data blocks of a file are linearly placed on a storage device and can be obtained by accessing the inode of the file. In contrast, a block distribution algorithm in an embodiment of the invention will vary the distribution of the data blocks on the storage device 125 in order to provide security to the data blocks, as discussed in additional details below.

Figure 2:
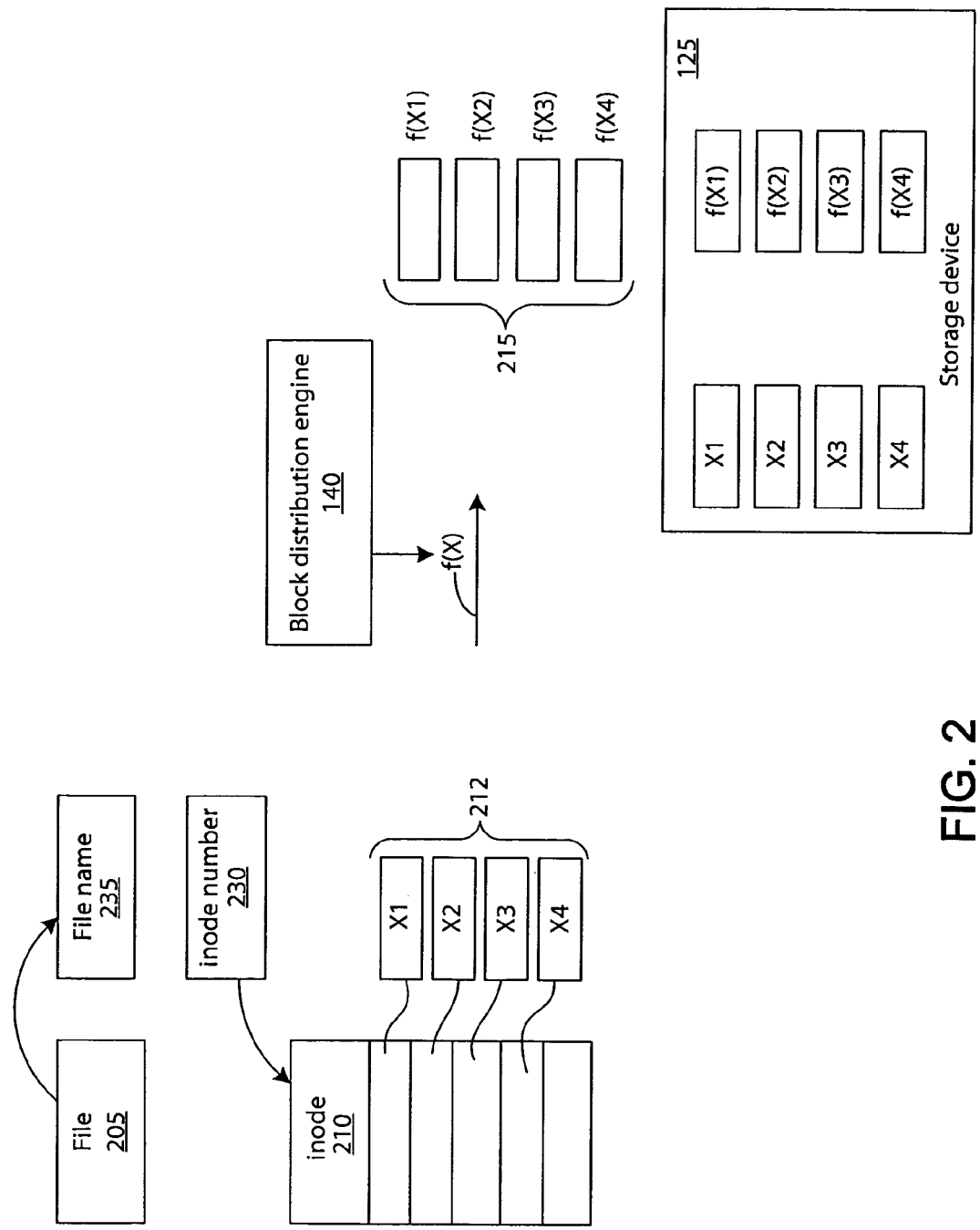
FIG. 2 is a block diagram that shows additional details of a data block mapping in accordance with an embodiment of the invention.

Reference is now made to FIGS. 1 and 2 for purposes of discussing the operations of embodiments of the invention. A read operation for a file is first discussed and a write operation for the file is then discussed.

During a read operation, if the data blocks for a file 205 (FIG. 2) are not found by the memory subsystem 130 (FIG. 1) in the memory cache 120 (FIG. 1) (in an embodiment that implements the checking of cached data in memory cache 120), then the disk I/O subsystem 135 sends a query 150 (FIG. 1) to the block distribution engine 140 which determines if the data blocks of the file 205 is mapped in the mapping 145. The mapping 145 is a data structure mapping of the blocks in an inode of the file 205 to an algorithm-specific data blocks. Note also that in the example of FIG. 2, the information on the data blocks (such the locations of the data blocks in the storage device 125) of a file 205 are identified in the inode 210. However, it is within the scope of the embodiments of the invention to use other data structures to store the data blocks information of a file 205, depending on the file system type.

If the data blocks of the file 205 is mapped by mapping 145 to algorithm-specific data blocks, then the block distribution engine 140 returns the algorithm-specific data block numbers 155 (FIG. 1) to the disk I/O subsystem 135. These algorithm-specific data block numbers 155 are the mapping of the data block numbers in the inode 210 of the file 205. An example of the data block number mapping is shown in FIG. 2. The subsystem 135 then passes the algorithm-specific data block numbers 155 to the block device driver 160 which then reads the data blocks of file 205 at addresses in storage device 125. The locations of these addresses in the storage device 125 are identified by the algorithm-specific data block numbers 155. The block device driver 160 can then read the data in the algorithm-specific data block numbers 155 locations in the storage device 125, and these data are the data of the file 205.

In contrast, if the data blocks of the file 205 are not mapped by the mapping 145, then the data block numbers of the inode 210 are passed the block device driver 160. In this case, the locations of the addresses in the storage device 125 of the data of the file 205 are identified by the data block numbers of the inode 210. The block device driver 160 can then read the data in the data block numbers of the inode 210.

An example of the data blocks mapping 145 is discussed with reference to FIG. 2. Assume that an inode 210 of file 205 points to four (4) data block numbers X1-X4. Note that a file can have more than four data block numbers in an inode, and X1-X4 are used herein only as an example for purposes of describing the details of an embodiment of the invention. The parameters X1-X4 are locations in the storage device 125, and X1-X4 will contain the data of the file 205. The block distribution engine 140 maps the data block numbers X1-X4 to different data block numbers f(X1)-f(X4), respectively, by applying the equation f(x) to the data block numbers x={X1, X2, X3, X4}. The equation f(x) can be any function that is applied to the variables X1-X4. As an example, assume that the data block numbers for inode 210 are the following: X1=1, X2=2, X3=3, and X4=4. Assume also as an example that f(x)=5x, although as noted above, f(x) can be programmed to be other functions. Therefore, the mapped data blocks 215 will be as follows: f(X1)=5, f(X2)=10, f(X3)=15, and f(X4)=20 Therefore, the data blocks 215 for the file 205 will be at the locations, data block numbers 5, 10, 15, and 20, in the storage device 125. The function f(x) is only an example of an algorithm that the algorithm designer can program for use by the block distribution engine 140. Therefore, the block distribution engine 140 can apply other algorithms to the data block numbers (x). The algorithm designer has the choice to design different functions f(x) that differ in complexity level, based on, for example, considerations of efficiency and security level of the mapping 145. For example, functions f(x) that are less complex mathematical equations provide efficiency because the block distribution engine 140 can perform a faster computation for f(x). In contrast, functions f(x) that are more complex mathematical equations provide a higher level of security for the mapping of the data block numbers. The typical characteristics of this function f(x) that the designer can consider should be, for example: (1) every block number (x) that is applied through the function f(x) maps to another unique block number f(x), (2) the mapped block number f(x) maps to only one data block number (x) that was requested by the disk I/O subsystem 135, (3) the data blocks on storage device 125 (disk) are preferably not wasted (i.e., the distribution of the locations of the address numbers f(x) are efficiently configured on the storage device 125).

A user who does not have the block distribution engine 140 and mapping 145 installed in his/her computer will not be able to read the data blocks f(X1)-f(X4) for the file 205 by simply accessing the inode 210 in the storage device 125 due to the mapping function f(x). Therefore, the mapping 145 of the data blocks 212 into the mapped data blocks 215 provides security to the file 205 data that are stored in a storage device 125. Specifically, the data block numbers X1-X4 (of blocks 212) are mapped to the algorithm-specific (mapped) data block numbers f(X1)-f(X4) of the data blocks 215. An unauthorized user will not be able to obtain the data for a file 205 by simply accessing the inode 210 of the file 205 and copying the data blocks 212, because the actual data of the file 205 are stored in the mapped data blocks 215.

During a write operation, the file system 110 assigns an inode (e.g., inode 210) to a file 205 to be written to the storage device 125. The disk I/O subsystem 135 identifies the inode number 230 of the inode 210. From the identified inode number 230, the disk I/O subsystem 135 identifies the filename 235 of file 205. The file system has a list of free data blocks (data blocks that presently do not contain data of files). From the list of free data blocks, assume that, e.g., blocks X1=1, X2=2, X3=3 and X4=4 are free blocks, and the file system allocates these 4 free blocks X1=1, X2=2, X3=3 and X4=4 for storing data of the file 205 to be written to disk. After block allocation and just before writing the data into the data blocks in the storage device 125 (disk), the block distribution engine 140 will apply the mapping function f(x) to all data block numbers X1-X4 that are linked to the filename 235. This linking will return the corresponding mapped block numbers f(X1)=5, f(X2)=10, f(X3)=15 and f(X4)=20 to the disk I/O subsystem 135 when the disk I/O subsystem 135 sends the data block numbers X1-X4 to the block distribution engine 140. The disk I/O subsystem 135 then sends the mapped block numbers 5, 10, 15, and 20 to the block device driver 160, and the block device driver 160 (FIG. 1) will write the data of the file 205 on the data block numbers 5, 10, 15, and 20 on the storage device 125. The read operation does the reverse operation as explained above and thus the integrity of the file system is not lost because there is linking from the filename 235, to the allocated data blocks numbers X1-X4 for the file 205, and then to the mapped data blocks numbers f(X1)-f(X4). Therefore, the disk I/O subsystem 135 (FIG. 1)

is able to obtain the correct mapped data block numbers f(X1)-f(X4) for a file 205 to be read, by starting with the filename 235 of the file.

Figure 3:
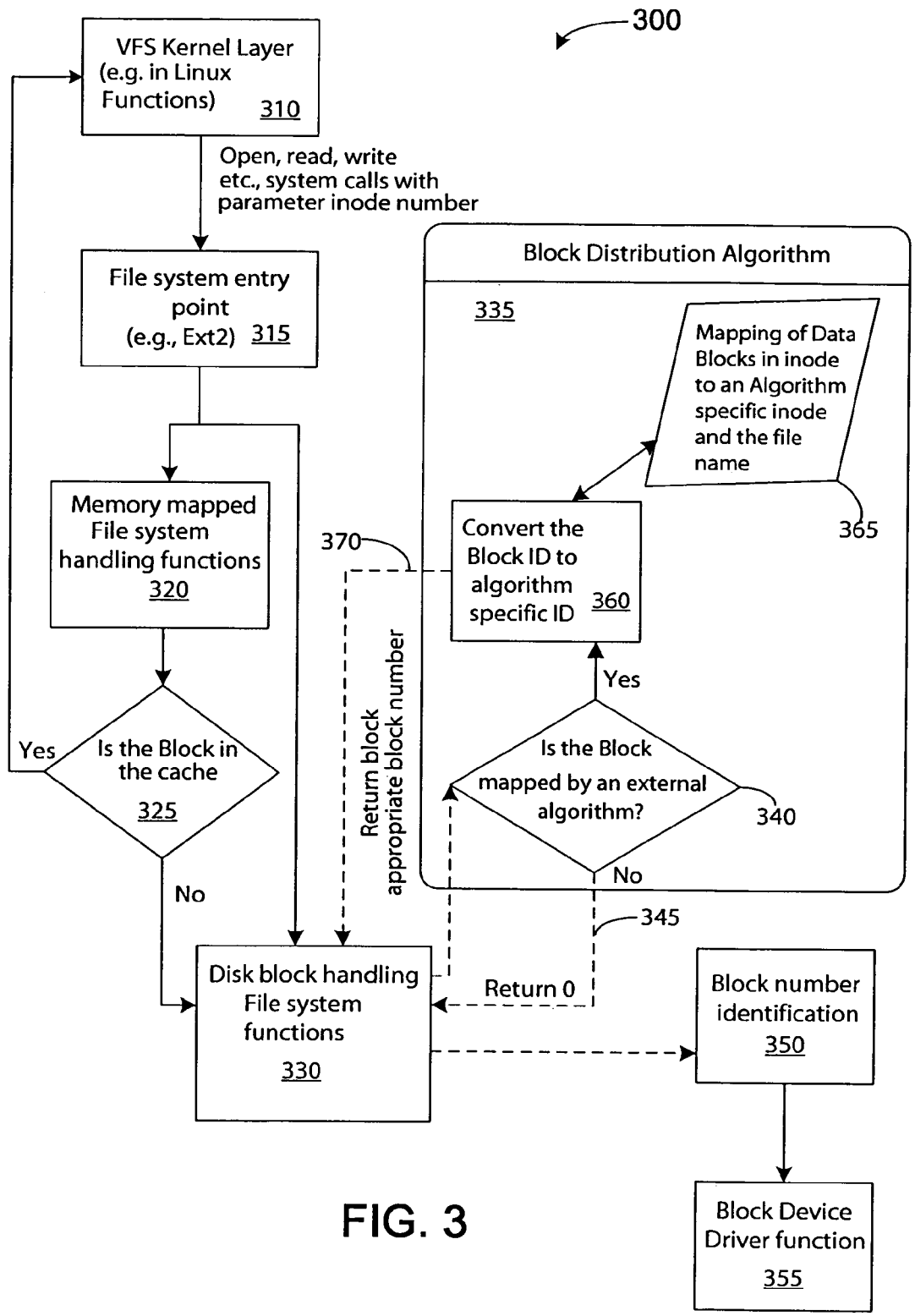
FIG. 3 is a flow diagram of a method in accordance with an embodiment of the invention.

FIG. 3 is a method 300 for a data security to be used in a file system, in accordance with an embodiment of the invention. In block 310, the VFS processes and forwards the system call with the inode number of a file to the file system. In block 315, the file system handles the system call. In block 320, the memory subsystem of the file system handles the system call. In block 325, if the data blocks of the file are in the memory cache, then the data blocks are returned to the VFS. The steps in blocks 320-325 are optional steps that are performed in embodiments of the invention that implements the checking of cached data in the memory cache 120 (FIG. 1).

In block 330, the disk I/O subsystem operates with a block distribution algorithm 335 which performs the following steps. The algorithm 335 determines in block 340 if each data block number in an inode of the file is mapped to an algorithm-specific data block number. An example of the algorithm 335 is the mapping function f(x) of FIG. 2). In block 340, if the data block numbers are not mapped to algorithm-specific data block numbers, then the data block numbers in the inode are returned (345) to the disk I/O subsystem and these data block numbers 350 are forwarded to a block device driver. In block 355, the block device driver performs the function of disk access to the storage device 125 based on the data block numbers 350.

In block 340, if the data block numbers in the inode of the file are mapped to algorithm-specific data block numbers based on a mapping function f(x), then in block 360, the block distribution engine 140 (FIG. 1) converts (maps) the data block numbers X1-X4 (FIG. 2) to the mapped data block numbers f(X1)-f(X4). In block 365, this mapping is stored in the data structure mapping 145 of FIG. 1. The block distribution engine 140 (FIG. 1) also returns 370 the algorithm-specific (mapped) data block numbers f(X1)-f(X4) to the disk I/O subsystem. In block 355, the block device driver will access the algorithm-specific data block numbers f(X1)-f(X4) in the storage device 125 in order to obtain the data of a file.

Embodiments of the invention provide various advantages such as providing a frame work for security of data on a storage device, providing various levels of security to the data based on a selected mapping function complexity, providing an opportunity to define security standards at the file system level, and providing a security frame work that can be used with different file system types such as, for example, ext2 (second extended file system) and FAT (File Allocation Table).

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of providing data security for use with a file system, the method comprising:
    applying a mapping function to data block numbers that are associated with a file, wherein the data block numbers are contained in an index node associated with said file; and
    obtaining mapped data block numbers after applying the mapping function, wherein the mapped data block numbers are addresses of data of the file in a storage device.

2. The method of claim 1, further comprising:
    storing a mapping of the data block numbers and the mapped data block numbers.

3. The method of claim 1, wherein a read operation for the file comprises:
    obtaining the data block numbers of the file;
    obtaining the mapped data block numbers of the file based on the mapping function that is applied to the data block numbers; and
    reading the data in the mapped data block numbers in the storage device.

4. The method of claim 1, wherein a write operation for the file comprises:
    allocating data block numbers of free data blocks in the storage device;
    linking the data block numbers to a file name of the file;
    applying the mapping function to the data block numbers in order to obtain the mapped data block numbers; and
    writing the data of the file into the mapped data block numbers in the storage device.

5. The method of claim 1, wherein the mapping function is an equation that is applied to each data block number of the file.

6. The method of claim 1, further comprising:
    selecting a complexity level of the mapping function in order to set a security level and efficiency of the mapping function.

7. The method of claim 1, wherein the data block numbers are addresses of data of the file in the storage device if the mapping function is not applied to the data block numbers.

8. The method of claim 1, wherein the mapping function prevents copying of data of the file in the storage device.

9. An apparatus for providing data security for use with a file system, the apparatus comprising:
    a block distribution engine configured to apply a mapping function to data block numbers that are associated with a file, wherein the data block numbers are contained in an index node associated with said file, and obtain mapped data block numbers after applying the mapping function;
    wherein the mapped data block numbers are addresses of data of the file in a storage device.

10. The apparatus of claim 9, wherein the block distribution engine is configured to store a mapping of the data block numbers and the mapped data block numbers.

11. The apparatus of claim 9, wherein for a read operation for the file, the block distribution engine obtains the data block numbers of the file from a file system, and obtains the mapped data block numbers of the file based on the mapping function that is applied to the data block numbers; and wherein a block device driver is configured to read the data in the mapped data block numbers in the storage device.

12. The apparatus of claim 9, wherein for a write operation for the file, the block distribution engine is configured to receive allocated data block numbers of free data blocks in the storage device from a file system, link the data block numbers to a file name of the file, and apply the mapping function to the data block numbers in order to obtain the mapped data block numbers; and wherein a block device driver is configured to write the data of the file into the mapped data block numbers in the storage device.

13. The apparatus of claim 9, wherein the mapping function is an equation that is applied to each data block number of the file.

14. The apparatus of claim 9, wherein a complexity level of the mapping function is selected in order to set a security level and efficiency of the mapping function.

15. The apparatus of claim 9, wherein the data block numbers are addresses of data of the file in the storage device if the mapping function is not applied to the data block numbers.

16. The apparatus of claim 9, wherein the mapping function prevents copying of data of the file in the storage device.

17. An apparatus for providing data security for use with a file system, the apparatus comprising:
  means for applying a mapping function to data block numbers that are associated with a file, wherein the data block numbers are contained in an index node associated with said file; and
  means for obtaining mapped data block numbers after applying the mapping function, wherein the mapped data block numbers are addresses of data of the file in a storage device.

18. Article of manufacture, comprising:
a machine-readable medium having stored thereon instructions to:
apply a mapping function to data block numbers that are associated with a file, wherein the data block numbers are contained in an index node associated with said file; and
obtain mapped data block numbers after applying the mapping function, wherein the mapped data block numbers are addresses of data of the file in a storage device.

* * * * *